(12) United States Patent
Chamot

(10) Patent No.: US 11,175,684 B2
(45) Date of Patent: Nov. 16, 2021

(54) THERMOSTATIC SINGLE-CONTROL CARTRIDGE AND MIXER TAP PROVIDED WITH SUCH A CARTRIDGE

(71) Applicant: VERNET, Ollainville (FR)

(72) Inventor: Jean Chamot, Mandelieu (FR)

(73) Assignee: VERNET, Ollainville (FR)

( * ) Notice: Subject to any disclaimer, the term of this patent is extended or adjusted under 35 U.S.C. 154(b) by 367 days.

(21) Appl. No.: 15/781,816

(22) PCT Filed: Dec. 6, 2016

(86) PCT No.: PCT/EP2016/079878
§ 371 (c)(1),
(2) Date: Jun. 6, 2018

(87) PCT Pub. No.: WO2017/097757
PCT Pub. Date: Jun. 15, 2017

(65) Prior Publication Data
US 2018/0364745 A1 Dec. 20, 2018

(30) Foreign Application Priority Data
Dec. 7, 2015 (FR) ...................................... 1502536

(51) Int. Cl.
*G05D 23/13* (2006.01)
(52) U.S. Cl.
CPC ................. *G05D 23/1353* (2013.01)
(58) Field of Classification Search
CPC ............. G05D 23/1353; G05D 23/132; G05D 23/1346
See application file for complete search history.

(56) References Cited

U.S. PATENT DOCUMENTS 2,079,165 A * 5/1937 Gorrie ..................... F01K 13/02
60/652
2,943,480 A * 7/1960 Nelting ................ G01R 17/105
73/767
(Continued)

FOREIGN PATENT DOCUMENTS

CN           1262384 A       8/2000
CN         201763433 U       3/2011
(Continued)

OTHER PUBLICATIONS

French Search Report for Application No. FR 1656965 dated Mar. 15, 2017.
(Continued)

*Primary Examiner* — Larry L Furdge
*Assistant Examiner* — Alexis K Cox
(74) *Attorney, Agent, or Firm* — Troutman Pepper Hamilton Sanders LLP

(57) ABSTRACT

A thermostatic single-control cartridge is provided with ceramic discs with a member for controlling a flow rate and a temperature of a mixed fluid by moving a thermostatic element, thus adjusting the temperature of the mixed fluid between end adjustment positions, an overtravel spring inserted between a regulating slide valve and the thermostatic element being compressed by an overtravel between the end adjustment positions. A retractable blocking system temporarily blocks the temperature adjustment of the mixed fluid in intermediate position of the control member between the end adjustment positions, so as to cut the overtravel in half in the intermediate position.

12 Claims, 9 Drawing Sheets

(56) References Cited

U.S. PATENT DOCUMENTS

Figure 1:
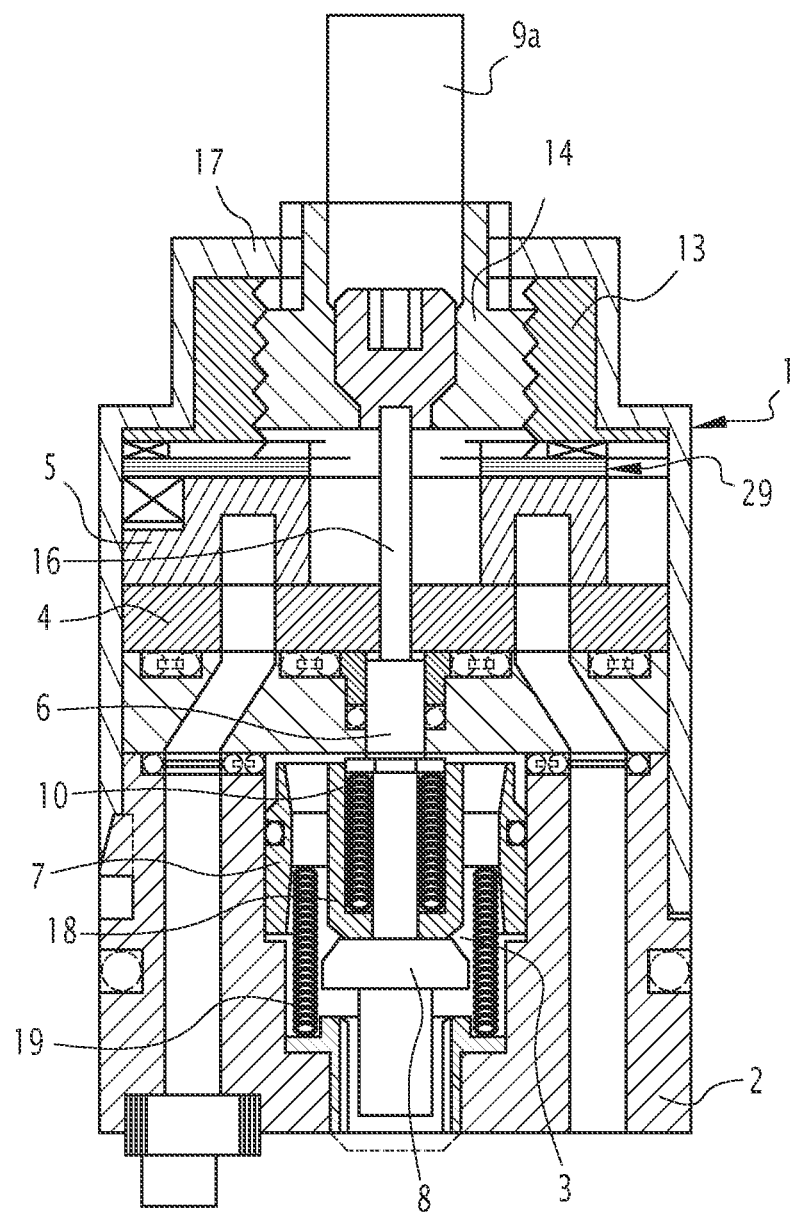

| | | | |
|---|---|---|---|
| 3,067,581 A * | 12/1962 | Ferdinando | F02M 37/04 |
| | | | 60/39.281 |
| 3,248,056 A | 4/1966 | Obermaier | |
| 3,409,039 A | 11/1968 | Griffin | |
| 4,257,553 A | 3/1981 | Sliger | |
| 4,283,823 A | 8/1981 | Buswell | |
| 4,630,770 A | 12/1986 | Sliger | |
| 4,691,861 A | 9/1987 | Sliger | |
| 4,763,834 A | 8/1988 | Duprez | |
| 5,253,617 A * | 10/1993 | Fitzpatrick | F01L 3/205 |
| | | | 123/184.54 |
| 5,400,961 A * | 3/1995 | Reggio | G05D 23/1393 |
| | | | 236/101 D |
| 5,549,244 A | 8/1996 | Kai | |
| 5,603,485 A | 2/1997 | Schwarz | |
| 5,899,378 A | 5/1999 | Hainle | |
| 8,028,926 B2 | 10/2011 | Heldberg et al. | |
| 8,028,936 B2 | 10/2011 | McDermott | |
| 9,133,942 B2 | 9/2015 | Ito | |
| 2002/0059906 A1 | 5/2002 | Friesenhahn | |
| 2002/0130189 A1* | 9/2002 | Mace | F16K 11/0743 |
| | | | 236/12.1 |
| 2003/0234295 A1* | 12/2003 | Mace | G05D 23/1353 |
| | | | 236/12.2 |
| 2007/0261738 A1 | 11/2007 | Mace | |
| 2008/0135633 A1 | 6/2008 | Heldberg | |
| 2009/0025809 A1 | 1/2009 | Oh | |
| 2009/0090669 A1* | 4/2009 | Holzmann | B01D 46/0002 |
| | | | 210/450 |
| 2010/0077583 A1 | 4/2010 | Takaya | |
| 2010/0089467 A1 | 4/2010 | Boulay | |
| 2010/0230504 A1* | 9/2010 | Pottie | G05D 23/022 |
| | | | 236/93 R |
| 2010/0242303 A1* | 9/2010 | Callahan | F16K 15/20 |
| | | | 36/28 |
| 2010/0294707 A1* | 11/2010 | Abdalla | B01D 29/111 |
| | | | 210/227 |
| 2011/0079307 A1* | 4/2011 | Marty | E03C 1/0401 |
| | | | 137/801 |
| 2011/0198518 A1 | 8/2011 | Habermann | |
| 2013/0112763 A1 | 5/2013 | Roman | |
| 2013/0126624 A1 | 5/2013 | Park | |
| 2013/0180477 A1 | 7/2013 | Nakajima | |
| 2013/0200167 A1 | 8/2013 | Auweder | |
| 2013/0264393 A1 | 10/2013 | Onishi | |
| 2013/0334324 A1 | 12/2013 | Ruga | |
| 2014/0345711 A1 | 11/2014 | Ueno | |
| 2016/0108797 A1 | 4/2016 | Palumbo | |
| 2016/0320763 A1* | 11/2016 | Jorgensen | G01D 4/002 |
| 2016/0333767 A1 | 11/2016 | Pattie | |
| 2018/0059693 A1 | 3/2018 | Rodriguez | |
| 2018/0223508 A1 | 8/2018 | Fassolette | |

FOREIGN PATENT DOCUMENTS

| | | |
|---|---|---|
| CN | 102536417 A | 7/2012 |
| DE | 197 16 307 A1 | 10/1998 |
| DE | 10 2005 001303 A1 | 7/2006 |
| EP | 1 020 671 A2 | 7/2000 |
| EP | 2335127 B1 | 3/2012 |
| FR | 2 841 348 A1 | 12/2003 |
| FR | 2 876 433 A1 | 4/2006 |
| FR | 3 003 046 A1 | 9/2014 |
| WO | 97/21949 A1 | 6/1997 |
| WO | 2005/124495 A1 | 12/2005 |
| WO | 2014/135614 A2 | 9/2014 |
| WO | 2015/086749 A1 | 6/2015 |

OTHER PUBLICATIONS

International Search Report and Written Opinion for Application No. PCT/EP2017/068407 dated Sep. 12, 2017.
International Search Report dated Jul. 4, 2016 during the prosecution of International Application No. PCT/EP2016/056547.
International Search Report issued by the International Searching Authority in International Application No. PCT/EP2017/059716, dated Aug. 4, 2017, 4 pages total.
Rapport De Recherche Préliminaire issued in corresponding French Patent Application No. 1653676 dated Jan. 5, 2017 (in French).
International Search Report issued by the International Searching Authority in International Application No. PCT/EP2017/059708, dated Aug. 1, 2017, 3 pages total.
International Search Report dated Mar. 1, 2017 during the prosecution of PCT/EP2016/079878.
International Preliminary Report on Patentability PCT/EP2016/079878 dated Jun. 12, 2018.

* cited by examiner

THERMOSTATIC SINGLE-CONTROL CARTRIDGE AND MIXER TAP PROVIDED WITH SUCH A CARTRIDGE

CROSS-REFERENCE TO RELATED APPLICATIONS

This is a U.S. national phase application under 35 U.S.C. § 371 of International Patent Application No. PCT/EP2016/079878, filed Dec. 6, 2016, and claims benefit of priority to French Patent Application No. 1502536, filed Dec. 7, 2015. The entire contents of these applications are hereby incorporated by reference.

FIELD OF TECHNOLOGY

The present invention relates to a thermostatic cartridge with ceramic discs having a reduced bulk for use in a thermostatic mixer tap.

BACKGROUND

Such cartridges may primarily equip thermostatic taps for showers, bathtubs, washbasins, sinks.

Mechanical ceramic cartridges or thermostatic taps are known from the state of the art.

Document FR-A-2,841,348 describes a thermostatic cartridge of the type comprising a body inside which a mixed fluid chamber, a disc stationary relative to said body and a disc movable relative to said body are arranged. The stationary disc is provided with several inlet and outlet passages respectively for cold fluid and hot fluid, and the moving disc is provided with passages suitable for placing the inlet and outlet passages of the stationary disc in communication.

This document provides a solution for effectively stabilizing the temperature of the output fluid, i.e., the fluid that has been mixed inside the cartridge and is hereinafter referred to as mixed fluid. However, the pressure and/or temperature of at least one of the input fluids, namely primarily cold water or hot water, may vary significantly and/or abruptly. Cartridges of this type have therefore been proposed equipped with a thermostatic element for adjusting the temperature of the output fluid.

To that end, the cartridge comprises thermostatic regulating means including a regulating slide valve positioned in the mixed fluid chamber, a thermostatic element located at least partly inside the mixed fluid chamber to which the regulating slide valve is mechanically connected, and a control member for the flow rate and temperature of the mixed fluid. This control member is suitable both for rotating and translating the movable disc relative to the stationary disc and for adjusting the proper positioning of the thermostatic element inside the mixed fluid chamber.

The body of the thermostatic element includes a thermostatic element containing a predetermined quantity of expandable wax. The wax expands, increasing in volume, when it goes from the solid state to the liquid state under the influence of a temperature increase. It retracts under the influence of a temperature decrease.

It is necessary to place a return spring on the piston of the thermostatic element to ensure that the latter returns in a controlled manner when the temperature decreases again.

In all of the thermostatic cartridge constructions regulated by a wax expansion element, the thermostatic element controls a hot fluid/cold fluid mixing slide valve to obtain a mixed fluid exiting at the desired temperature, regulated by a control lever outside the cartridge.

This control lever cooperates with a control member supported by the cartridge to transmit the actuation of the control lever to the inside of the cartridge. This control member is associated adjustably with the piston of the thermostatic element positioned between the control member and the latter.

The control member opens the mixed fluid outlet of the cartridge between opening positions corresponding to a minimum cold temperature and a maximum hot temperature.

During use, one may go abruptly from one temperature to the other during adjustments with the control lever. For example, it is possible to go from a minimum cold temperature to a maximum hot temperature. This causes the slide valve to be opened wide on the hot fluid side without any problem for the thermostatic element.

Conversely, when going from the maximum hot temperature to a minimum cold temperature, this causes the slide valve to be opened wide on the cold side and will cause the expandable piston of the thermostatic element to retract. This retraction is not immediate: it depends on the reaction time of the thermostatic element. It is necessary, in order to account for the retraction delay of the piston of the thermostatic element, to provide an overtravel spring, which must accept the travel from a maximum temperature to a minimum temperature of the thermostatic element, hereinafter called C1.

Thus, this overtravel spring is inserted between the regulating slide valve and the thermostatic element inside the mixed fluid chamber and which is the hottest maximum temperature to the coldest minimum temperature.

This overtravel spring makes it possible to avoid blocking of the piston in the expanded position, and a risk of breaking or "decalibration" of the thermostatic element.

This overtravel is very detrimental in the construction of the cartridge, since it extends the total length of the latter. It is normal to provide an overtravel spring that must have an overtravel of about 4 mm minimum, which means a spring length from 12 to 15 mm, which increases the bulk of the cartridge.

Yet there is a strong demand for making a thermostatic single-control cartridge including an expandable element interchangeable with ceramic mechanical cartridges with smaller dimensions according to the current standards, for example a cartridge having an outer diameter of 40 mm and a height of 43 mm, or a cartridge having an outer diameter of 35 mm and a height of 41 mm.

The problem at the base of the present invention is to design a thermostatic single-control cartridge for a mixer tap from a cold fluid and a hot fluid allowing an effective adjustment of the temperature and flow rate of the mixed fluid while having the smallest possible dimensions to correspond to the existing standards.

SUMMARY

To that end, the invention relates to a thermostatic cartridge, comprising a body, arranged inside which are a mixed fluid chamber, a stationary disc that is stationary relative to said body and a movable disc that is movable relative to the stationary disc, the stationary disc being provided with at least two inlet passages and at least two outlet passages respectively for cold fluid and hot fluid and the movable disc being provided with passages adapted, for each of the cold and hot fluids, to place the inlet and outlet passages of the stationary disc in communication, a regulating slide valve positioned in the mixed fluid chamber, a thermostatic element which is located at least partially inside the mixed fluid chamber and to which the regulating slide valve is mechanically connected and a control member for controlling a mixed fluid flow rate and temperature, the control member being suitable both for rotating and translating the movable disc relative to the stationary disc and for adjusting the position of the thermostatic element inside the mixed fluid chamber, the control member adjusting the temperature of the mixed fluid between end adjustment positions respectively corresponding to a minimum cold temperature and a maximum hot temperature of the mixed fluid, wherein an overtravel spring interposed between the regulating slide valve and the thermostatic element is placed inside the regulating slide valve to immobilize the regulating slide valve in a regulating phase from a minimum temperature to a maximum temperature with a load about twice the load of a regulating spring and is provided to accept a necessary overtravel value during abrupt temperature changes, and wherein the thermostatic cartridge temporarily blocks temperature adjustment of the mixed fluid in an intermediate position of the control member between said two end adjusting positions so as, in this intermediate position, to cut overtravel in half relative to the necessary overtravel value.

The value of the necessary overtravel C1 is cut in half with the invention owing to two successive steps.

Retractable blocking means are present that temporarily block the temperature adjustment of the mixed fluid in an intermediate position of the control member between said two end adjusting positions. The compression of the overtravel spring from the maximum hot position to the intermediate position accepts an overtravel at most equal to about half of the travel C1, or 2 mm instead of 4 mm.

It is therefore possible to provide a decreased spring length sufficient for guaranteeing an overtravel smaller than the overtravel necessary for a spring in the state of the art, and therefore a smaller bulk lengthwise. This is obtained due to the fact that the cartridge according to the present invention makes it possible to cut the overtravel in half owing to the retractable blocking in the intermediate position.

According to the state of the art, a retractable stop may exist, temporarily preventing an adjustment from a cold temperature to the hot temperature with an intermediate so-called comfortable temperature. This stop is retractable to adjust to the maximum hot temperature. It is does not work in the maximum hot temperature to minimum cold temperature direction, and is therefore unidirectional.

Such a stop is not comparable to the retractable blocking means according to the invention, given that in the invention, the retractable stop works in both directions. In the minimum temperature to maximum temperature direction while blocking at a comfortable temperature like in the existing taps, and in the direction of a variation from maximum temperature to minimum cold temperature. It is therefore bidirectional, unlike that of the existing taps.

It is, however, possible to keep a stop of the state of the art for a cartridge according to the present invention, this stop having a completely different role from the retractable blocking means and not interfering with that existing on the commercially available thermostatic taps.

Optionally, the invention further comprises at least one of the following features:

The body includes a cover housing a control nut in which is inserted an adjusting screw provided with an outer thread engaged with an inner thread of the control nut, the adjusting screw bearing against a piston of the thermostatic element, a maneuvering bracket intended to be secured to a control lever acting as control member driving the adjusting screw in translation in the body.

The thermostatic cartridge comprises a spring, inserted into a housing arranged in the control nut, and a ball, the ball being able to be across from an inner wall of the cover while being returned by the spring protruding from the control nut to penetrate a slot inwardly borne by the cover in the intermediate position of the control member, said spring and said ball being provided to temporarily block temperature adjustment of the mixed fluid in an intermediate position of the control member between said two end adjusting positions so as, in this intermediate position, to cut overtravel in half relative to the necessary overtravel value.

The overtravel spring is housed radially inside a hub belonging to the regulating slide valve.

The movable disc comprises at least one cold fluid passage suitable for placing the inlet passage(s) for the cold fluid in communication with outlet passage(s) for the cold fluid of the stationary disc and at least one hot fluid passage suitable for placing the inlet passage(s) for the hot fluid in communication with outlet passage (s) for the hot fluid of the stationary disc.

The stationary disc includes, for each of the cold and hot fluids, two inlet passages separated from each other, two outlet passages separated from each other, the inlet passages and the outlet passages for the cold and hot fluids being distributed over the stationary disc alternating.

The stationary disc, two inlet and outlet passages are provided for each of the cold and hot fluids.

At least part of the inlet and outlet passages has alternating ring shapes that are concentric relative to the center of the stationary disc.

The cartridge has at least two flat gaskets matching the inlet and outlet orifices for the hot and cold fluid, with an overmolded metal and rubber base.

According to another object of the invention, a thermostatic mixer tap is provided, the thermostatic mixer tap being equipped with a cartridge as defined above and including a control lever for controlling the flow rate and temperature of the mixed fluid, secured to the control member of the cartridge.

BRIEF DESCRIPTIONS OF THE DRAWINGS

Figure 2:
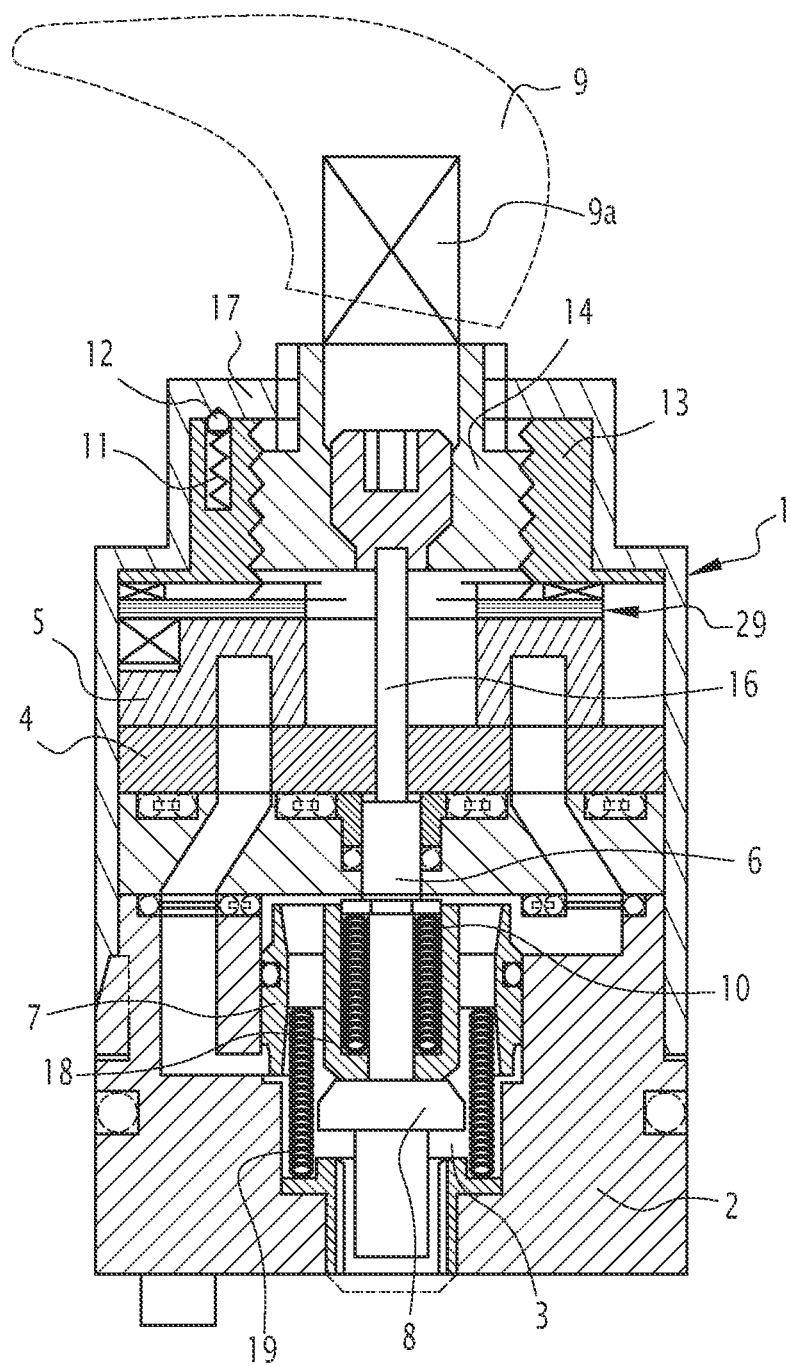
Figure 3:
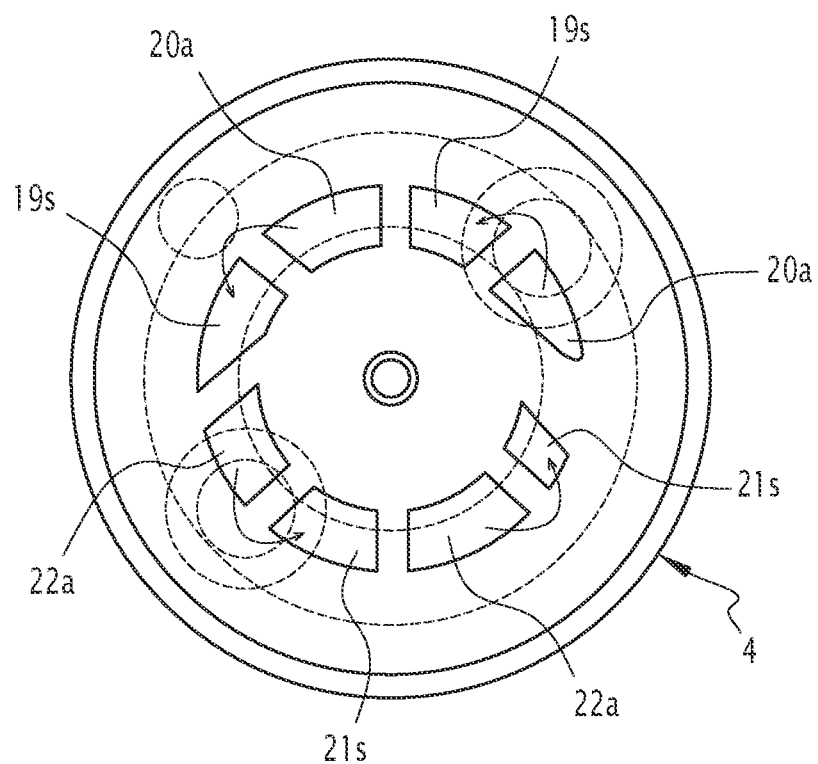
Figure 4:
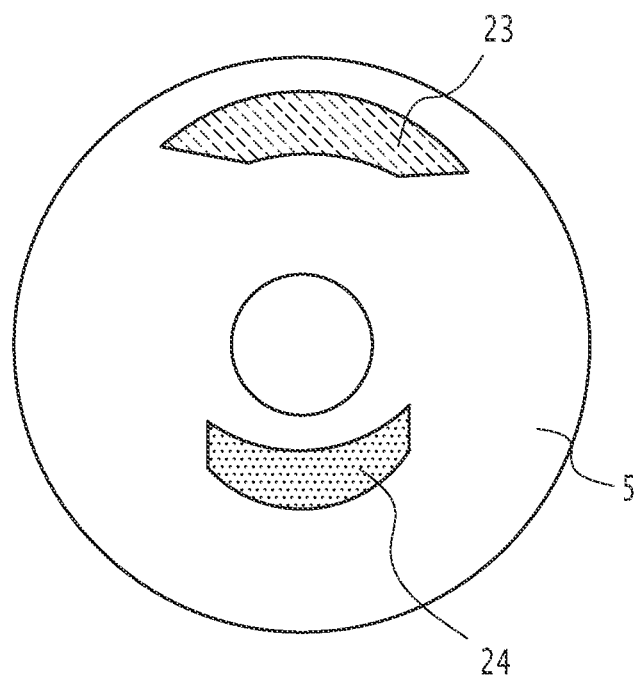
Figure 5:
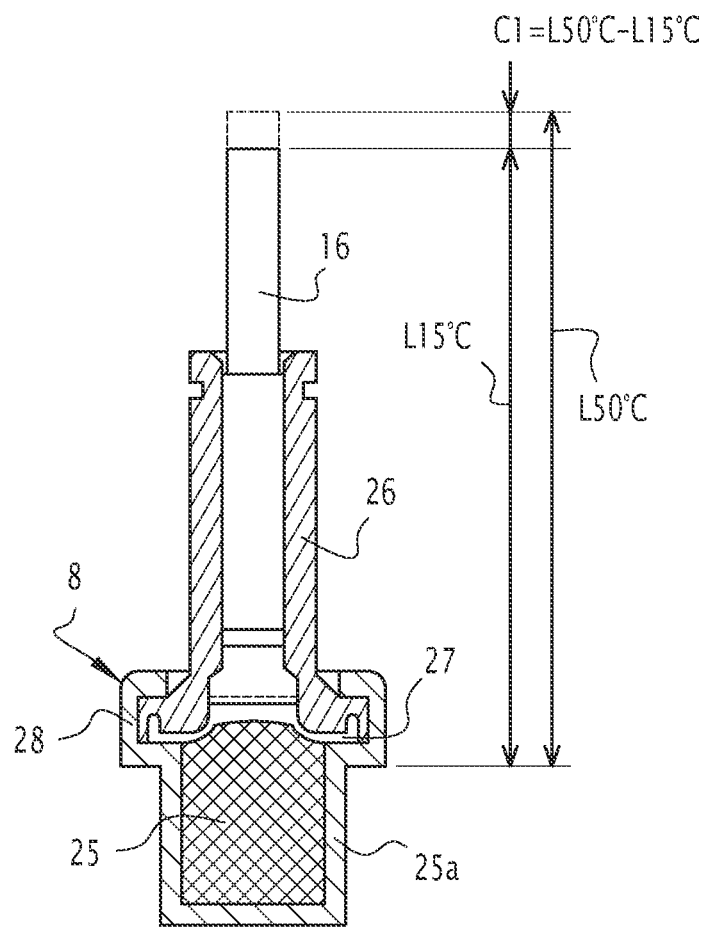
Figure 6:
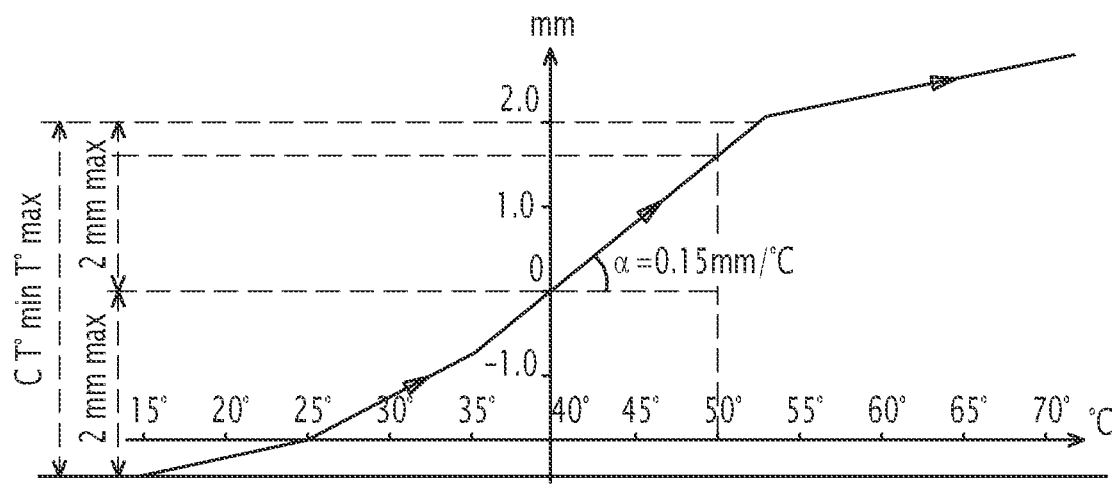

Other features, aims and advantages of the present invention will appear upon reading the following detailed description and in light of the appended drawings, provided as non-limiting examples and in which:

FIG. 1 is a schematic illustration of a longitudinal sectional view, along a first plane, of one embodiment of a thermostatic cartridge according to the invention, an outer control lever being associated with the cartridge, the cartridge being shown with the top open wide, FIG. 2 is a schematic illustration of a longitudinal sectional view, in a second plane, of the embodiment of a thermostatic cartridge shown in FIG. 1, with the blocking means in an intermediate position between a cold mixed fluid position and a fluid position at the temperature being visible in this position. It should be noted that other retractable stop means can be implemented, by outside action placed on the control lever for the temperature and flow rate, FIG. 3 is a schematic illustration of a top view of one embodiment of a stationary disc belonging to the cartridge according to the present invention, FIG. 4 is a schematic illustration of a top view of one embodiment of a movable disc belonging to the cartridge according to the present invention, FIG. 5 is a schematic illustration of a longitudinal sectional view of a thermostatic element belonging to the cartridge according to the present invention, FIG. 6 illustrates a curve showing the travel of the piston of the thermostatic element as a function of the temperature of the mixed fluid leaving a cartridge according to the present invention.

Figure 7:
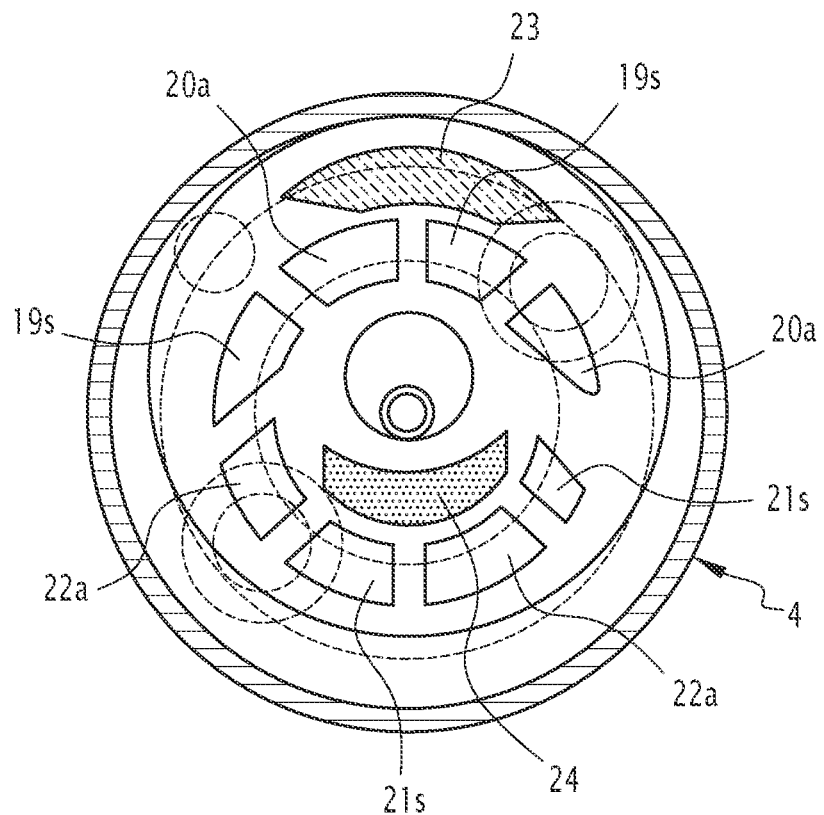
Figure 8:
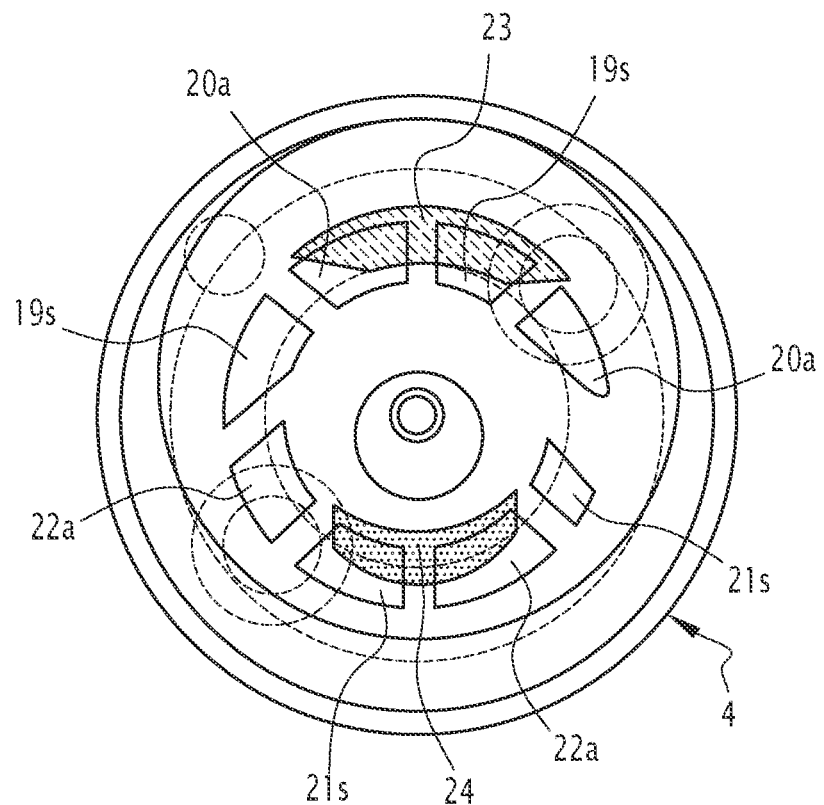
Figure 9:
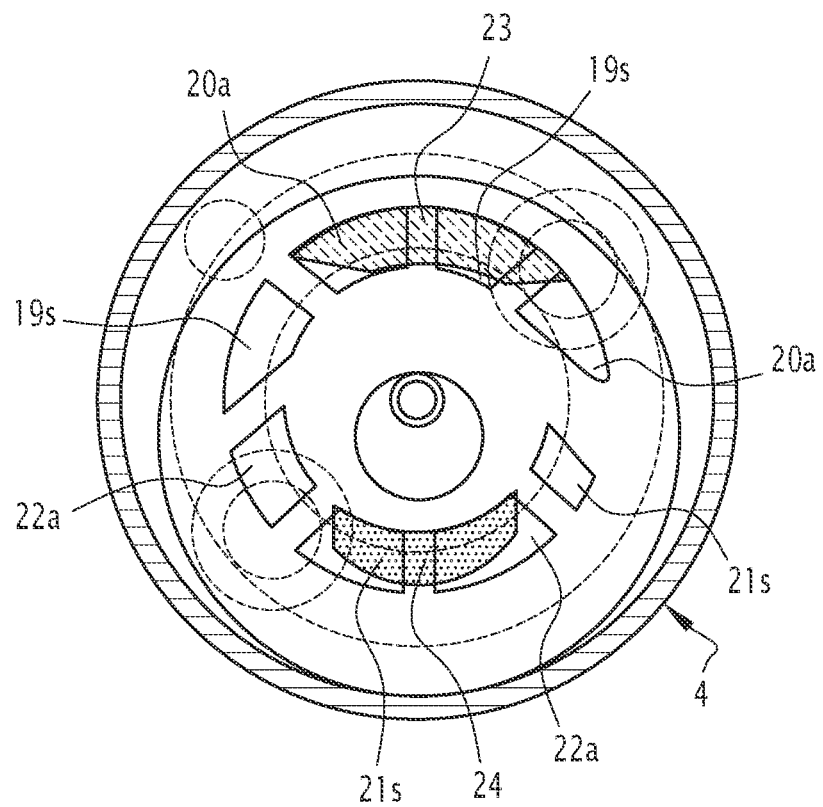

FIGS. 7 to 9 schematically show different flow rate positions of the movable disc on the stationary disc in the intermediate temperature position.

DETAILED DESCRIPTION

In reference to all of the figures, and more particularly FIGS. 1 and 2, the present invention relates to a thermostatic single-control cartridge 1 of the type including a body 2 inside which a mixed fluid chamber 3, a stationary disc 4 relative to said body 2 and a movable disc 5 relative to said stationary disc 4 are arranged. The mixed fluid is most often water, the temperature of which can be adjustable via a thermostatic element 8 and elements associated with it.

The stationary disc 4 is provided with at least two cold inlet passages 20a and at least two outlet passages 19s and two hot inlet passages 22a and at least two outlet passages 21s.

The movable disc 5 is provided with passages 23, 24 suitable for placing cold-side inlet 20a and outlet 19s passages and hot-side inlet 22a and outlet 21s passages of said stationary disc 4 in communication. This will be better seen in light of FIGS. 3 and 4.

The cartridge 1 comprises thermostatic regulating means 6 including a regulating slide valve 7 positioned in the mixed fluid chamber 3. A thermostatic element 8 is situated at least partially inside the mixed fluid chamber 3, to which the thermostatic element 8 is connected by the overtravel spring, which immobilizes the regulating slide valve 7. A regulating spring 19 of the slide valve 7 returns the piston of the thermostatic element. It has a load value lower by about half than the load of the overtravel spring, which immobilizes the slide valve in the regulating position.

The adjustments of the flow rate and temperature of the mixed fluid leaving the cartridge 1 are done by a control member 9a suitable both for rotating and translating the movable disc 5 relative to the stationary disc 4 and for adjusting the piston of the thermostatic element 8 inside the mixed fluid chamber 3 as a function of the desired temperature. The control member 9a can close the flow rate of the cartridge.

In no case does any fluid leave the cartridge 1, the control member 9a also making it possible to adjust the temperature of the mixed fluid leaving the cartridge 1 by rotation.

Thus, the control member can place the cartridge 1 between temperature adjustment end positions corresponding on the one hand to a mixed fluid leaving the cartridge 1 at a minimum cold temperature, and on the other hand to a mixed fluid leaving the cartridge 1 at a maximum hot temperature. Between these two positions, intermediate open positions may exist with a more or less hot mixed fluid leaving the cartridge 1.

Thus, like in all of the thermostatic cartridge constructions regulated by a wax expansion element, the wax being housed in the thermostatic element 8 as will be outlined later in light of FIG. 5, the thermostatic element 8 controls a regulating piston 16 for mixing hot fluid/cold fluid to obtain the mixed fluid exiting at the desired temperature, regulated by the control lever 9a. This control member 9a is intended to be secured to a maneuvering lever 9 outside the cartridge 1 and able to be actuated by a user's hand.

Owing to the wax contained in the thermostatic element 8, if a cold fluid cutoff occurs and a hot fluid supply continues, the thermostatic element 8 will expand and cause the hot fluid to close, which constitutes the burn protection safety mechanism.

A regulating spring 19 returns the piston of the thermostatic element when one is in the phase for regulating the temperature of the mixed output fluid. It is necessary to provide an overtravel spring 10 that immobilizes the slide valve in the phase for regulating the temperature of the mixed fluid.

The overtravel spring 10 is preloaded at a value about twice as high as the value of the regulating spring 19. The regulating spring 19 only acts in the phase for regulating the temperature of the mixed fluid.

The overtravel spring 10 only acts in the following cases:
  in case of burn protection safety when the cold water shutoff is used while the hot water continues to be supplied. The overtravel is always less than 2 mm in this case, therefore less than what falls within the scope of the present invention.
  in case of a closed tap remaining adjusted to a temperature of 15° C., but placed in an ambient temperature of 30° C. or more. The overtravel is always less than 2 mm in this case, therefore less than what falls within the scope of the present invention.
  during rapid movements of the control lever 9 by the actuator, where two cases may arise:
  during rapid movement of the temperature control lever from cold minimum to comfortable temperature (38 or 40° C.): the slide valve opens the hot fluid channel wide and the piston expands to this comfortable temperature owing to the retractable stop 12. The same is true from the comfortable temperature to the maximum hot temperature. In both cases, the slide valve opens the hot fluid intake wide. The piston of the thermostatic element will move with some delay, which has no impact on the blocking of the piston of the thermostatic element, which can expand without being stressed.
  during rapid movement from the maximum hot temperature position to the minimum cold temperature. In this case, the slide valve opens the cold water passage wide and the element retracts with some delay. The overtravel spring must accept the travel C1, the value of which is the difference in position of the piston from the maximum hot position to the minimum cold position, as shown in FIG. 5.

This operating situation represents the maximum overtravel subject to the present invention, by temporarily blocking the movement of the adjustment from the maximum temperature to the intermediate temperature and which results in cutting the value of this overtravel in half using the retractable stop 12. This is the harshest operating condition for the overtravel spring.

The same is true for the passage from the intermediate temperature position to the minimum cold position, which represents the other half of the overtravel C1.

The maximum necessary overtravel occurs during a temperature adjustment toward lower temperatures. The retractable blocking means 11, 12 are therefore effective during the passage from a very hot mixed fluid temperature, for example at the extreme temperature at a minimum cold temperature, to an intermediate position corresponding to a moderately hot temperature, for example a so-called comfortable temperature.

The invention primarily consists of using an overtravel spring 10 having a travel of less than half the value of the travel C1 necessary in the existing standard thermostatic cartridges. In the case shown in FIG. 6, this illustrates an overtravel taken into account in building the cartridge according to the invention, which would be 2 mm instead of 4 mm in an existing construction.

An overtravel of 2 mm represents an in-place length of the spring of 6 mm, while in a construction according to the state of the art, a necessary overtravel would be 4 mm, which represents an in-place length of 12 mm, or an increase in bulk of the cartridge of 6 mm to be completely passed on to the bulk of the cartridge corresponding to the invention relative to an existing cartridge according to the state of the art. This is obtained by the retractable blocking means 11, 12 allowing stopping, temporary and of limited duration, of the adjustment from the intermediate temperature to make up the travel of the overtravel spring 10.

A gain of 6 mm over the total length of the cartridge 1 is therefore possible by reducing the length of the overtravel spring 10. The value of the overtravel of 2 mm in the described case is sufficient because the temperature adjustment, advantageously by moving a control lever, is done in two parts owing to the retractable blocking means 11, 12, then forming a retractable stop.

These retractable locking means 11, 12 are effective when going to an intermediate temperature adjustment position, advantageously the comfortable temperature between 38 and 40° C., as will be described later. This allows the thermostatic element 8 to stabilize at the comfortable temperature or at the completely cold temperature in order to make up the overtravel of the overtravel spring 10.

It is advantageous for the intermediate position to be at a substantially moderate temperature between the two adjustment end positions, with an intermediate temperature found approximately midway between the temperatures of the end positions. Thus, half of the overtravel can be canceled out upon reaching, then stopping in the intermediate position, which subtracts it from the total overtravel.

For example, for an overtravel of 4 mm, which is an overtravel frequently reached for an overtravel spring 10 of a thermostatic cartridge 1, by choosing an intermediate position wisely, it is possible to recover 2 mm of overtravel. An overtravel spring 10 that should have a theoretical overtravel of 4 mm can therefore be designed to tolerate only 2 mm of overtravel, resulting in a reduction of its length making it possible to decrease the total bulk of the cartridge 1 heightwise.

The body 2 may include a cover 17 housing a control nut 13 in which an adjusting screw 14 is inserted provided with an outer thread engaged with an inner thread of the control nut 13. The adjusting screw 14 can be bearing on one side against the piston 16 of the thermostatic element 8. On the other side, a maneuvering bracket 9a intended to be secured to a control lever 9 serving as control member can drive the adjusting screw 14 to convert the rotating movement of the maneuvering lever into vertical translation in the body 2 to adjust the temperature.

In one preferred embodiment of the present invention, the control member, advantageously in the form of a maneuvering bracket, can be mounted pivoting around an axis traversing the control nut and extending perpendicular to a longitudinal axis of the control member.

The control nut 13 rotates in the cover 17. The maneuvering bracket 9a serving as M control member is connected to the rotating control nut 13 and drives a carriage located between the control nut 13 and the movable disc 5. The carriage 29 moves in a radial direction and in rotation to drive the movable disc 5.

In one preferred embodiment, the retractable blocking means 11, 12 are in the form of a spring 11 inserted into a housing arranged in the control nut 13 and a ball 12. The ball 12 can be across from an inner wall of the cover 17 while being returned by the spring 11 protruding from the control nut 13 to penetrate a slot inwardly borne by the cover 17 in the intermediate position of the control member 9a.

Other systems can be used to control the withdrawal of the retractable stop from outside the lever.

In one preferred practical scenario, the cold temperature end position of a mixed fluid leaving the cartridge 1 can be about 15° C. The hot temperature end position can be 50° C. and the intermediate temperature substantially midway between these two cold and hot temperatures can be a comfortable temperature between 38 and 40° C. that is 23 to 250 higher than the extreme cold temperature and 10 to 12° C. lower than the hot temperature. This is not limiting.

The invention also relates to a thermostatic mixer tap equipped with such a cartridge. The mixer tap includes a control lever 9 for the flow rate and temperature of the mixed fluid. This control lever 9, visible in FIG. 2, is secured to the control member 9a of the cartridge 1.

In a method for opening a thermostatic mixer tap comprising a cartridge 1 according to the present invention as well as adjusting the temperature of the mixed fluid leaving the cartridge 1, this temperature can be adjusted between an extreme cold temperature and a maximum extreme hot temperature normalized in France at 50° C. to avoid burns, in particular for children.

The opening of the tap and the temperature adjustment of the mixed fluid leaving the cartridge 1 are done by an action by a user's hand on the control lever 9 transmitting this action to the control member 9a borne by the cartridge 1.

According to the invention, when the control lever 9 is actuated between extreme hot and cold temperatures, to decrease the temperature, the control lever 9 is temporarily blocked at the intermediate value and exerts resistance against its desired actuation by the user, this resistance being able to be perceptible by the user, during the passage in the intermediate position of the control lever 9 corresponding to a mixed fluid temperature between the two extreme temperatures.

This blocking is done during a downward temperature adjustment from a hot temperature, for example the maximum hot temperature 50° C., to an intermediate temperature, for example the comfortable temperature around 40° C.

This blocking or this resistance may nevertheless be overcome by the user, who then exerts a slightly greater pressure on the control lever 9. It may also be possible to provide an unblocking means other than pressure on the control lever 9.

What matters is for a long enough stop, for example around a second, to be obtained in this intermediate position so that the overtravel of the overtravel spring 10 is sufficient to accept the 2 mm of overtravel existing between the maximum hot temperature and the intermediate or comfortable temperature.

This blocking or this resistance can be as small as possible while being compatible with the response time of the thermostatic element. The use of a thermostatic element with a very short response time can be considered in this case, for example a latest-generation element with a mixture of wax and peelable copper powder or expanded graphite to improve the thermal conductibility of the thermostatic mixture, therefore the reaction time of the thermostatic element, and to reduce the stop time at the intermediate temperature.

Next, to lower the temperature from the intermediate temperature, for example a comfortable temperature of 38 or 40° C., to a minimum cold temperature, for example 23 or 25° C., the retractable blocking means 11, 12 are unlocked by the user. This can be done by performing a new actuation of the control lever 9 with, if applicable, at the beginning of this new actuation, the imposition of a higher actuating force on the control lever 9.

Alternatively, a means can be used for retracting the blocking means 11, 12 that is independent from the control lever 9, for example a pushbutton activated by the user when he wishes to resume actuating the control lever 9.

Toward the maximum hot temperature position, a stationary stop is provided to provide burn protection safety for children that no longer allows the control lever 9 to be actuated in the direction increasing the temperature of the mixed fluid leaving the cartridge 1. However, this stationary stop performs a function other than the blocking means 11, 12 according to the present invention.

According to one embodiment of the invention, first, from the maximum hot temperature to the intermediate temperature, advantageously the comfortable temperature between 38 and 40° C., a stop is observed of around one second at this comfortable temperature, this stop being caused by the retractable blocking means 11, 12. The stop time depends on the unblocking force of the retractable stop system by action on the control lever 9.

Secondly, from the intermediate position, advantageously the comfortable temperature, to the completely cold temperature, after forcing or retraction of the blocking means 11, 12, an overtravel of 2 mm occurs that is sufficient to accept the travel of the piston of the thermostatic element between these two temperatures.

Indeed, the movement of the control lever 9 is done discontinuously from the maximum hot temperature to the completely cold temperature with a brief stop of about one second at the intermediate temperature, advantageously the comfortable temperature of 38 to 40° C., and next from the intermediate temperature to the completely cold temperature.

Additional features of the present invention will now be described.

As shown in FIGS. 1 and 2, the overtravel spring 10 can be housed radially inside a hub 18 belonging to the regulating slide valve 7.

As shown in FIGS. 3 and 4, the movable disc 5 can comprise at least one hot fluid passage 24 suitable for placing the inlet passage(s) in communication with the hot fluid outlet passage(s) of the stationary disc 4 and at least one cold fluid passage 23 suitable for placing the inlet passage(s) in communication with the hot fluid outlet passage(s) of the stationary disc 4.

In light of FIG. 3, the stationary disc 4 includes, for a same cold or hot fluid, two inlet passages 20a and 22a separated from each other and two outlet passages 19s and 21s separated from each other. The inlet passages 20a and 22a and the outlet passages 19s and 21s for a same cold or hot fluid can be distributed on the stationary disc 4 in an alternating manner, advantageously in the form of ring portions equidistant from the center of the cartridge.

Still in light of FIG. 3, on the stationary disc 4, there are two inlet 20a and 22a and outlet 19s and 21s passages are per cold or hot fluid.

These fluid passages are dimensioned to have the largest and most uniform possible fluid passage section in all temperature adjustment positions.

There may therefore be 2×4 openings in the stationary disc 4 of a cartridge according to the present invention, in place of 2×5 openings in a stationary disc as produced in the state of the art.

The cartridge 1 may have at least two flat gaskets with an overmolded metal- and rubber-based form. These gaskets replace the traditional rubber gaskets. This makes it possible to further decrease the diameter of the cartridge, for example to reach 40 mm.

FIG. 5 shows a longitudinal sectional view of a thermostatic element 8 belonging to the cartridge according to the present invention. This figure shows the heat-sensitive part 25a or thermostatic part formed by a reservoir containing a mixture 25 of wax and copper or graphite powder.

The heat-sensitive part 25a is closed inside the thermostatic element 8 by a deformable membrane 27 transmitting the expansion or retraction of the wax to the piston 16. The piston 16 protrudes from the thermostatic element 8 while being partially inserted into a guide 26 extending the heat-sensitive part 25 toward the piston 16. A shoulder 28 of a cup of the heat-sensitive part 25a is crimped on the guide 26 to obtain sealing of the wax mixture 25 owing to a rubber membrane 27.

FIG. 6 shows a curve depicting the travel of the piston of the thermostatic element as a function of the temperature of the mixed fluid leaving a cartridge according to the present invention. In this figure, the minimum cold mixed fluid temperature is 15° C. and corresponds to a travel of the piston of about less than 2 mm, relative to the comfortable temperature, for example about 40° C.

The comfortable temperature zone extending from 35° C. to 45° C. corresponds to a travel zone of the rod from −0.8 mm to +0.8 mm with a rectilinear increase of the curve relative to the temperature in the form of a line having a more pronounced travel increase slope for the comfortable temperature zone than the slope in the previous zone between 15° C. and 35° C. The slope in the comfortable zone can be 0.15 millimeters per degree Celsius, or 0.15 mm/° C. in this zone.

From the comfortable zone, this travel increase slope remains the same up to a maximum hot temperature of about 50° C., advantageously 53° C., for which temperature a travel of 2 mm is reached. Next, from 53° C. to higher temperatures, for example up to 70° C., the travel increase slope lessens to about 0.05 mm/° C. for a liquid phase of the wax.

The use of a thermostatic element with a rapid reaction time can favor the tracking of the speed/movement curve of the rod with an overtravel of less than 2 mm in the described example.

The speed/movement characteristics can be verified by laboratory instrumentation for the cartridge, equipped with sensors for the movement and measuring the reaction time of the thermostatic element The force of the spring of the retractable stop is next adjusted based on the laboratory instrumentation results.

This construction described in the invention makes it possible not to alter the reliability of the thermostatic device irrespective of the usage conditions, since this thermostatic element is never subject to blocking of its expansion with the risks of bursting or decalibration of the thermostatic element being possible.

The present invention makes it possible to obtain a particularly efficient and strong bathroom thermostatic mixer tap. It also makes it possible to eliminate the check valves of the traditional bathroom and shower thermostatic mixers, as well as any flow rate adjusting tap part necessary with the current technology.

A decrease in weight and bulk can be obtained for a tap using a cartridge according to the present invention, given that the volume of the body of the tap decreases significantly relative to the technology known from the state of the art.

The system for driving rotation and translation in the upper part of the cartridge is not outlined, since it is known in the state of the art.

The invention claimed is:

1. A thermostatic cartridge, comprising:
a body, arranged inside which are a mixed fluid chamber, a stationary disc that is stationary relative to said body and a movable disc that is movable relative to the stationary disc, the stationary disc being provided with at least two inlet passages and at least two outlet passages respectively for cold fluid and hot fluid, and the movable disc being provided with passages adapted, for each of the cold and hot fluids, to place the inlet and outlet passages of the stationary disc in communication,
a regulating slide valve which is positioned in the mixed fluid chamber,
a thermostatic element, which is located at least partially inside the mixed fluid chamber and to which the regulating slide valve is mechanically connected,
a maneuvering bracket controlling a mixed fluid flow rate and temperature, the maneuvering bracket being configured both to rotate and translate the movable disc relative to the stationary disc and to adjust the position of the thermostatic element inside the mixed fluid chamber, the maneuvering bracket adjusting the temperature of the mixed fluid between end adjustment positions respectively corresponding to a minimum cold temperature and a maximum hot temperature of the mixed fluid,
an overtravel spring, which is interposed between the regulating slide valve and the thermostatic element and which is placed inside the regulating slide valve to immobilize the regulating slide valve during a regulating phase from a minimum temperature to a maximum temperature, the overtravel spring being preloaded with a force that is twice the preloaded force of a regulating spring and being configured to have a travel preventing damage caused by overtravel of the regulating slide valve during temperature changes, and
a retractable blocking system, which bi-directionally acts on the maneuvering bracket and which is configured to temporarily block manual temperature adjustment of the mixed fluid in an intermediate position of the maneuvering bracket between said two end adjusting positions.

2. The cartridge according to claim 1, wherein the body comprises a cover housing a control nut in which is inserted an adjusting screw provided with an outer thread engaged with an inner thread of the control nut, the adjusting screw bearing against a piston of the thermostatic element, and wherein the maneuvering bracket is secured to a control lever and is configured to drive the adjusting screw in translation in the body.

3. The cartridge according to claim 2, wherein the retractable blocking system comprises a spring, which is inserted into a housing of the control nut, and a ball, which is across from an inner wall of the cover while being biased by the spring to protrude from the control nut and to penetrate a slot inwardly borne by the cover when the maneuvering bracket is in the intermediate position.

4. The cartridge according to claim 1, wherein the overtravel spring is housed radially inside a hub belonging to the regulating slide valve.

5. The cartridge according to claim 1, wherein the movable disc comprises at least one cold fluid passage suitable for placing the inlet passage(s) for the cold fluid in communication with outlet passage(s) for the cold fluid of the stationary disc and at least one hot fluid passage suitable for placing the inlet passage(s) for the hot fluid in communication with outlet passage(s) for the hot fluid of the stationary disc.

6. The cartridge according to claim 5, wherein the stationary disc includes, for each of the cold and hot fluids, two inlet passages separated from each other, two outlet passages separated from each other, the inlet passages and the outlet passages for the cold and hot fluids being distributed over the stationary disc alternating.

7. The cartridge according to claim 6, wherein, on the stationary disc, two inlet and outlet passages are provided for each of the cold and hot fluids.

8. The cartridge according to claim 5, wherein the inlet and outlet passages for each of the cold and hot fluids are distributed on the stationary disc in an alternating manner.

9. The cartridge according to claim 7, wherein the cartridge has at least two flat gaskets matching the inlet and outlet passages for the hot and cold fluids.

10. A thermostatic mixer tap equipped with a cartridge according to claim 1, wherein the thermostatic mixer tap includes a control lever for controlling the flow rate and temperature of the mixed fluid, secured to the maneuvering bracket of the cartridge.

11. The cartridge according to claim 8, wherein the inlet and outlet passages for each of the cold and hot fluids have ring shapes that are concentric relative to a center of the stationary disc.

12. The cartridge according to claim 9, wherein each flat gasket has a metal base overmolded with rubber.

* * * * *